(No Model.)  2 Sheets—Sheet 1.

J. MALLOY.
SPITTOON.

No. 466,354.  Patented Jan. 5, 1892.

Witnesses:  Inventor.
E. A. Fincicel  John Malloy
Philip F. Larner  by Wm. R. Fincicel
  his Atty

THE NORRIS PETERS CO., PHOTO-LITHO., WASHINGTON, D. C.

(No Model.) 2 Sheets—Sheet 2.

J. MALLOY.
SPITTOON.

No. 466,354. Patented Jan. 5, 1892.

Witnesses.

Inventor.
John Malloy.
by Wm. H. Fincuel
his Atty.

UNITED STATES PATENT OFFICE.

JOHN MALLOY, OF ESCANABA, MICHIGAN.

SPITTOON.

SPECIFICATION forming part of Letters Patent No. 466,354, dated January 5, 1892.

Application filed March 20, 1891. Serial No. 385,814. (No model.)

*To all whom it may concern:*

Be it known that I, JOHN MALLOY, a citizen of the United States, residing at Escanaba, in the county of Delta and State of Michigan, have invented a certain new and useful Improvement in Spittoons, of which the following is a full, clear, and exact description.

The object of this invention is to provide for bar-rooms, billiard-rooms, pool-rooms, and the like, stationary spittoons and means for carrying away their filth.

In my invention I utilize a pipe which may extend along the front of the bar outside of the bar or which may be arranged around a billiard or pool table, which pipe is inclined toward an outlet to a sewer. This pipe is provided with stationary spittoons connected therewith by suitable nipples or unions and emptying into it. A water-supply—for example, the sinks of the bar or a special tap—may be connected with the pipe in order to carry away the filth from the spittoons into the sewer.

I will describe the principle of my invention first, and then particularly point out and distinctly claim the part or implement which I claim as my invention.

Figure 1:
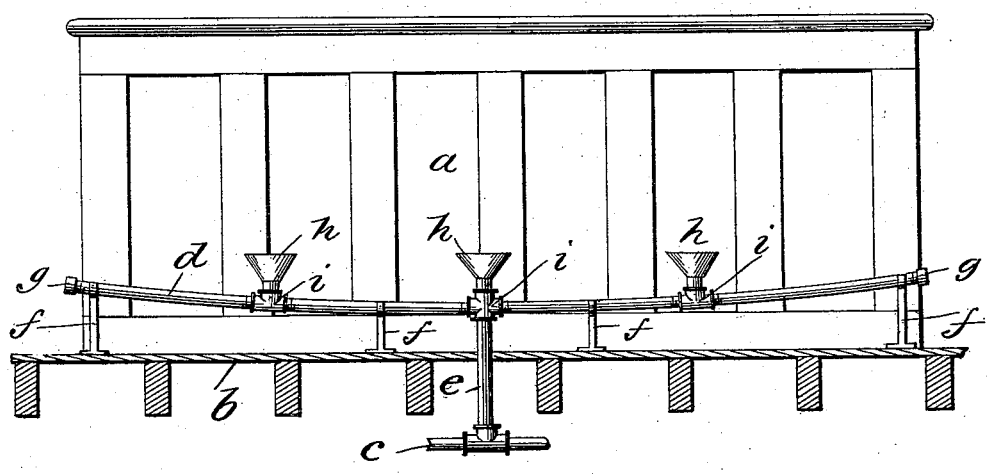
Figure 2:
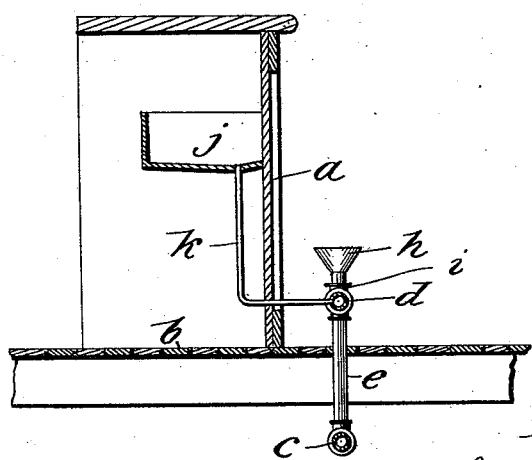
Figure 3:
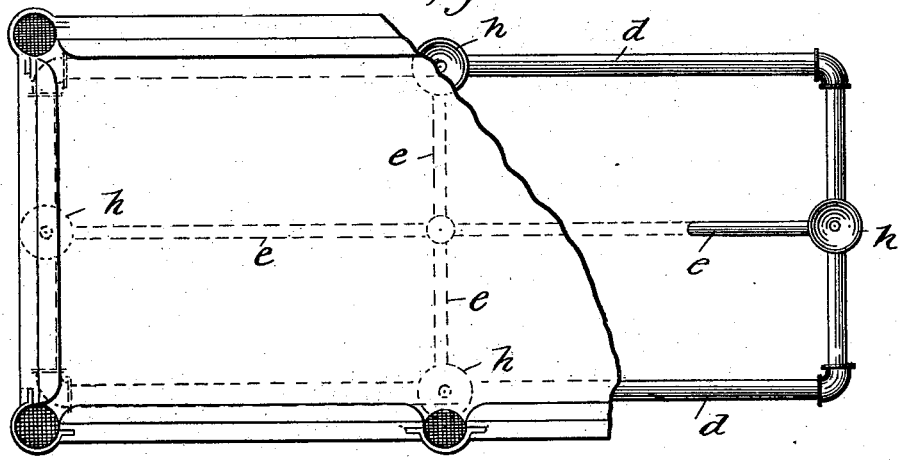
Figure 4:
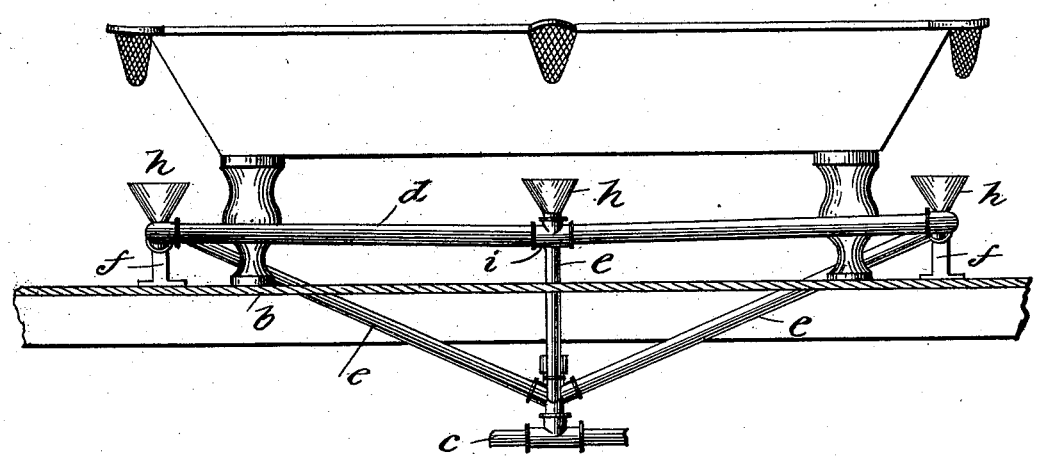

In the accompanying drawings, illustrating my invention, in the several figures of which like parts are similarly designated, Figure 1 is a sectional front elevation, and Fig. 2 a sectional side elevation, of a bar equipped with my invention. Fig. 3 is a partial plan, and Fig. 4 a side elevation, of a pool-table supplied with my invention.

The letter *a* designates the bar, *b* the floor, and *c* a sewer-pipe. A pipe *d*, here shown as inclining from its ends toward the center, is connected with the sewer-pipe by means of a branch pipe *e*. This pipe *d* is supported upon the brackets *f*, and the ends of the pipe are closed with screw-caps *g*. The pipe *d* in this arrangement may serve the purpose of the ordinary foot-rail. I further utilize it to receive stationary spittoons *h*. These spittoons may be made of metal with threaded outlets which are tapped into unions *i*, so that the said spittoons become fixtures, to all intents and purposes, of the pipe *d*. The spittoons open directly into the pipe *d*, and the matter they receive flows or falls immediately into the pipe *d*, and thus is carried through the branch pipe *e* into the sewer-pipe *c*. One end of the pipe *d* may be connected with a water-supply or other running stream. Access to the interior of the pipe *d* may be had by removing one of the caps *g* and flushing the same by means of hose inserted in the end of the pipe. A constant source of flushing may be had from the sinks *j* ordinarily employed in bars, and for this purpose I connect the sinks by means of pipes *k* with the pipe *d*. The waste from the sink or sinks is thus not only carried away immediately, but subserves the additional purpose of flushing or washing out the pipe *d* and preventing the accumulation of filth in the spittoons and in the said pipe.

In order to apply my stationary spittoons to a pool-table, I connect any number of such spittoons—say four—by means of a frame of pipe. This frame also serves as a foot-rest. From each spittoon there may descend at an incline a pipe, which is joined to a common inlet to a sewer-pipe. Inasmuch as the parts employed are substantially the same in function and operation as those employed in the case of the bar, I have designated them by the same letters, *d* being the combined foot-bar and pipe, *h* the spittoons, *e* the branch pipe leading from the spittoons to the sewer-pipe *c*, and *f* the brackets for supporting the pipe *d*. Water may be introduced through the spittoons or otherwise in order to flush the pipe *d* in this arrangement.

Some of the advantages resulting from the use of my invention are that the spittoons, being stationary, are not capable of being upset and scattering their filth over the floor, neither can they be moved from place to place to the annoyance of persons, nor can they be used as weapons in unfortunate encounters. Moreover, they may be readily cleansed, and the fluid used for cleansing them immediately carried off into the sewer.

What I claim is—

1. A pipe forming a foot-rail for bars and other fixtures, combined with a suitable number of spittoons rigidly secured thereto and emptying therein, means for flushing said pipe, and a sewer connection for said pipe, substantially as described.

2. A pipe forming a foot-rail for bars and other fixtures, combined with a suitable number of spittoons rigidly secured thereto, a sewer connection, and a bar-sink connected with the pipe to flush it and carry away the filth from the spittoons, substantially as described.

3. A pipe, brackets to support it around or about a bar or pool-table or the like in position for use as a foot-rest, and screw-threaded unions in said pipe, combined with spittoons having screw-threaded nipples engaged with the unions, whereby they are rigidly affixed to said pipe and open into it, and a sewer connection for conducting away the filth from the spittoons through the said pipe, substantially as described.

In testimony whereof I have hereunto set my hand this 5th day of February, A. D. 1891.

JOHN MALLOY.

Witnesses:
 WM. H. FINCKEL,
 PHILIP F. LARNER.